(12) United States Patent
Gauthier et al.

(10) Patent No.: US 8,820,478 B2
(45) Date of Patent: Sep. 2, 2014

(54) LUBRICATING AND COOLING EPICYCLIC STEPDOWN GEARING

(75) Inventors: Gerard Philippe Gauthier, Champagne sur Seine (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 380 days.

(21) Appl. No.: 13/201,511

(22) PCT Filed: Feb. 15, 2010

(86) PCT No.: PCT/FR2010/000121
§ 371 (c)(1),
(2), (4) Date: Aug. 15, 2011

(87) PCT Pub. No.: WO2010/092263
PCT Pub. Date: Aug. 19, 2010

(65) Prior Publication Data
US 2011/0299974 A1 Dec. 8, 2011

(30) Foreign Application Priority Data

Feb. 16, 2009 (FR) ..................................... 09 00692

(51) Int. Cl.
*F16H 57/04* (2010.01)
*F02C 7/36* (2006.01)

(52) U.S. Cl.
USPC .................. 184/6.12; 415/122.1; 475/139

(58) Field of Classification Search
USPC ............... 184/6.11, 6.12; 415/122.1; 475/159
See application file for complete search history.

(56) References Cited

U.S. PATENT DOCUMENTS

| 5,102,379 | A   | * | 4/1992  | Pagluica et al. ............... 475/331 |
| 5,107,676 | A   |   | 4/1992  | Hadaway et al. |
| 8,425,361 | B1  | * | 4/2013  | Beckner et al. ............... 475/159 |
| 2011/0124461 | A1 | * | 5/2011 | Torii et al. ..................... 475/159 |
| 2012/0121378 | A1 | * | 5/2012 | Sheridan et al. ................. 415/1 |
| 2012/0275904 | A1 | * | 11/2012 | McCune et al. ........... 415/122.1 |

FOREIGN PATENT DOCUMENTS

| DE | 1 985 822 | 5/1968 |
| FR | 2 928 976 | 9/2009 |
| GB | 2 234 035 | 1/1991 |

OTHER PUBLICATIONS

International Search Report issued Jun. 28, 2010 in PCT/FR10/000121 filed Feb. 15, 2010.

\* cited by examiner

*Primary Examiner* — William E Dondero
*Assistant Examiner* — Robert T Reese
(74) *Attorney, Agent, or Firm* — Oblon, Spivak, McClelland, Maier & Neustadt, L.L.P.

(57) ABSTRACT

A lubricating and cooling epicyclic stepdown gearing, for example in an aeroengine turbomachine, including a cylindrical casing mounted on a planet-carrier of the gearing and forming a centrifugal scoop surrounding stationary oil-delivery strips, the cylindrical casing including radial ducts feeding nozzles pointing towards zones where the planet gears mesh with outer ring(s) of the gearing.

12 Claims, 4 Drawing Sheets

LUBRICATING AND COOLING EPICYCLIC STEPDOWN GEARING

The invention relates essentially to a device for lubricating and cooling epicyclic stepdown gearing, in particular in a turbomachine such as an aeroengine.

Epicyclic stepdown gearing is suitable for transmitting high levels of power. In a turbojet engine, it can be used for driving contrarotating propellers from a driveshaft that is rotating much faster than the propellers.

In conventional manner, epicyclic gearing comprises a central or sun gear, an outer ring gear, and planet gears that mesh with the sun gear and with the ring gear, and the support of one of those three components must be prevented from rotating in order to enable the gearing to operate. When the planet-carrier is prevented from rotating, the central gear and the ring are respectively driving and driven, or vice versa. Lubricating and cooling the gearing and the shafts of the planet gears then present no difficulty and is done by nozzles that do not rotate and that can spray oil continuously onto the zones where the planet gears mesh with the central gear and with the ring, and onto the shafts of the planet gears.

Nevertheless, in the most usual configuration, it is the outer ring that is stationary in rotation, and the central gear and the planet-carrier that are driving and driven. Lubricating the shafts and the meshing zones of the planet gears then raises a problem that is solved in the prior art by complex networks of pipes for conveying oil under pressure, making use of dynamic seals or rotary joints that are subjected to wear and that need to be verified and changed regularly.

A particular object of the present invention is to cool and lubricate such gearing continuously and without having recourse to a complex network of pipes of oil under pressure associated with rotary joints.

To this end, the invention provides epicyclic stepdown gearing comprising a central gear, an outer ring, and planet gears meshing with the central gear and with the outer ring, the planet gears being mounted to rotate freely on a planet-carrier, the gearing including lubricating and cooling means operating by spraying oil onto the sets of teeth and onto the axes of the planet gears, the gearing being characterized in that the lubricating and cooling means comprise a cylindrical casing secured to the planet-carrier and forming a scoop for recovering oil, which casing surrounds stationary means for delivering oil.

In order to lubricate and cool meshing zones of the planet gears and their rotary axes, in the invention it suffices to fit the planet-carrier with a cylindrical casing that surrounds the stationary means for delivering oil. The oil delivered by these means is recovered by the centrifugal effect in the cylindrical casing, from which it can be conveyed both to the zones where the planet gears mesh and to the axes of said planet gears without it being necessary to use rotary joints for that purpose.

These lubrication and cooling means are therefore characterized by their simplicity and their reliability, and by their compatibility with means for feeding oil to other equipment that needs to be lubricated and cooled in a turbomachine, thus making it possible to install a common oil feed pump for the gearing and for the other equipment.

According to another characteristic of the invention, the cylindrical casing includes radial or substantially radial ducts for feeding oil to nozzles pointing towards the sets of teeth and the axes of the planet gears.

In a preferred embodiment of the invention the stationary means for delivering oil comprise at least one strip parallel to the shaft of the central gear and carrying injectors pointing radially towards the cylindrical casing, the casing including annular compartments that are separated by radial partitions, each of which is connected to ducts for feeding nozzles.

This configuration enables oil to be delivered in a manner that is more uniform and regular towards the various zones that need to be lubricated and cooled.

In practical manner, the cylindrical casing and the planet-carrier are positioned axially on either side of the central gear and they are connected together by axial arms extending between the planet gears.

The invention also provides a turbomachine such as an aeroengine turbojet, characterized in that it includes epicyclic stepdown gearing of the above-described type connecting a turbine shaft to one or two propeller drive shafts.

The invention can be better understood and other characteristics, details, and advantages thereof appear more clearly on reading the following description made by way of example with reference to the accompanying drawings, in which.

Figure 1:
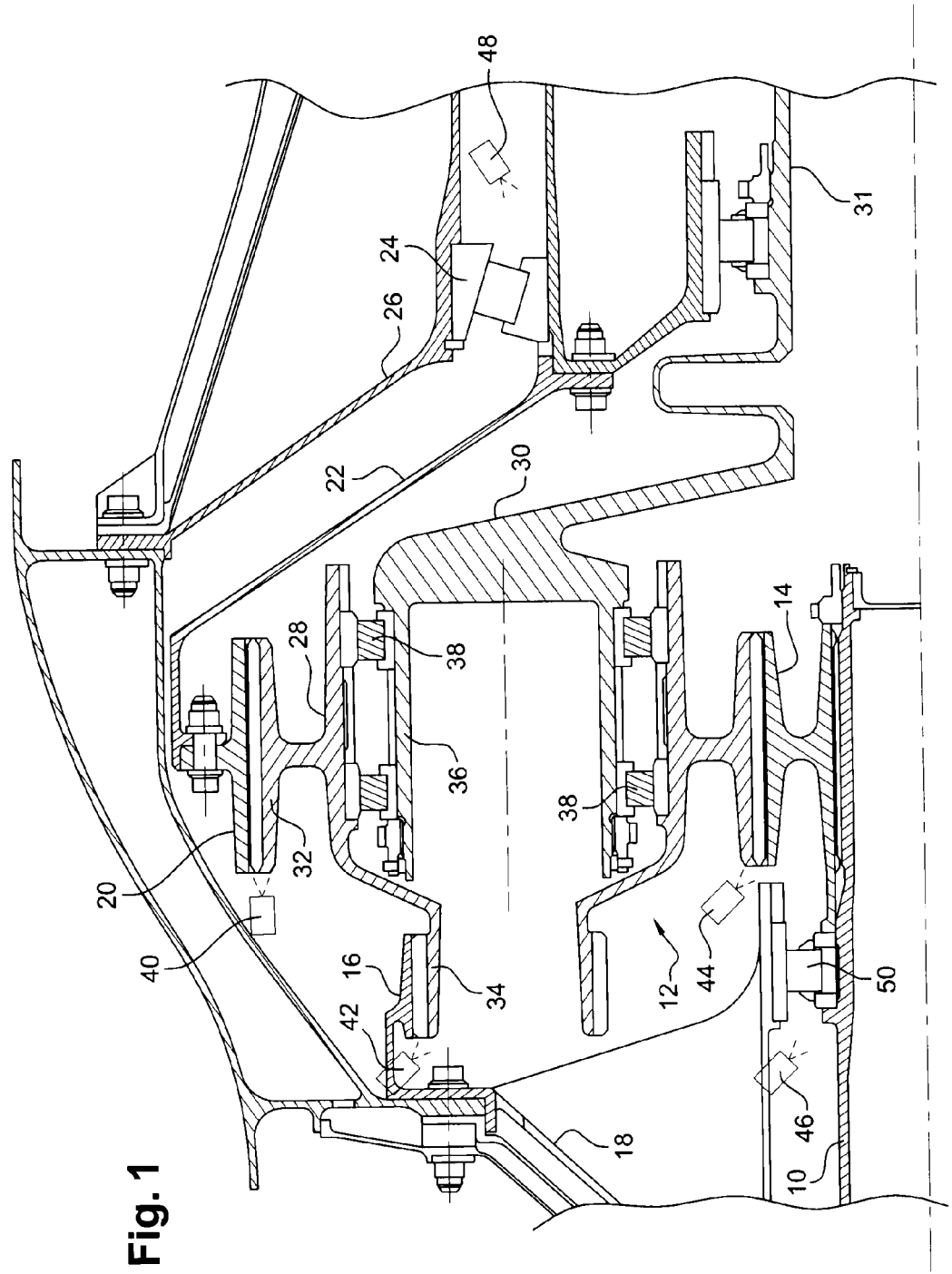
FIG. 1 is a diagrammatic half-view in axial section of epicyclic stepdown gearing in a prior art turbomachine.

Reference is made initially to FIG. 1, which is a diagram showing known epicyclic stepdown gearing, mounted in a turbomachine such as an airplane turbojet having two contrarotating propellers that are driven in rotation from a turbine shaft 10 via epicyclic stepdown gearing 12 essentially comprising a central or sun gear 14 constrained to rotate with the turbine shaft 10, a stationary first outer ring 16 mounted on a stationary element 18 of the turbomachine, a moving second outer ring 20 that is fastened to the end of a shaft 22 for driving one of the propellers of the engine in rotation, said shaft extending downstream and being guided in rotation by bearings 24 on a stationary structural element 26 of the engine, the gearing also including planet gears 28 that mesh with the central gear 14, with the stationary first outer ring 16, and with the moving second outer ring 20, and that are mounted to rotate freely on a planet-carrier 30 that is secured to a shaft 31 that extends downstream for driving the second propeller of the engine in rotation.

More precisely, each planet gear 28 comprises a first peripheral set of teeth 32 that meshes with an inner set of teeth of the second outer ring 20, and a second set of teeth 34 on the same axis as the first set of teeth, and formed at the upstream end of the planet gear 28, this second set of teeth 34 meshing with an inner set of teeth of the stationary first ring 16.

Each gear 28 is also mounted and guided in rotation on a cylindrical support 36 of the planet-carrier 30 by means of bearings 38, e.g. such as roller bearings.

The stepdown gearing 12 is lubricated and cooled by means of nozzles 40, 42, 44 that are carried by stationary elements of the engine and that are pointed towards the zones where meshing takes place respectively between the outer sets of teeth 32 of the planet gears 28 and the second outer ring 20, the outer sets of teeth 34 of the planet gears 28 and the first outer ring 16, and the peripheral sets of teeth 32 of the planet gears 28 and the central gear 14, as shown diagrammatically in FIG. 1.

Other nozzles 46 and 48 are used for lubricating and cooling the bearings 50 for guiding in rotation the shaft 10 and the bearing 24 for guiding in rotation the shaft 22 that is secured to the second outer ring 20.

Figure 2:
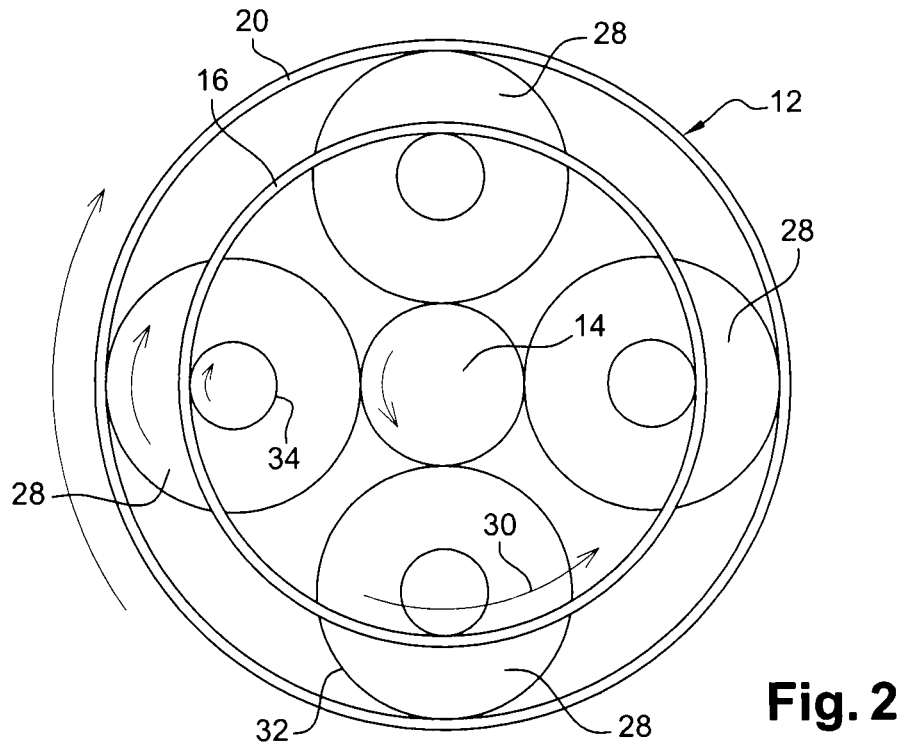
FIG. 2 is a diagrammatic face view of the FIG. 1 gearing.

FIG. 2 shows the essential components of the stepdown gearing 12, namely the central gear 14, the stationary first outer ring 16, the second outer ring 20 secured to the shaft 22, and the planet gears 28, there being four of them in this embodiment, with arrows indicating the directions of rotation of the gears, of the moving outer ring 20, and of the planet-carrier 30.

It can be seen that when the central gear 14 is driven in rotation in a counterclockwise direction, the planet gears 28 and the moving outer ring 20 are driven in rotation in a clockwise direction, while the planet-carrier 30 rotates in the counterclockwise direction.

In this known embodiment, the zones where the sets of teeth of the planet gears mesh with the central gear 14, and where they mesh with the rings 16 and 20 can be lubricated and cooled only intermittently, since the nozzles 40, 42, and 44 do not rotate and cannot follow the orbital motion of the planet gears 28 inside the rings. Furthermore, the prior art does not provide any solution for lubricating and cooling the bearings 38 of the planet gears.

Figure 3:
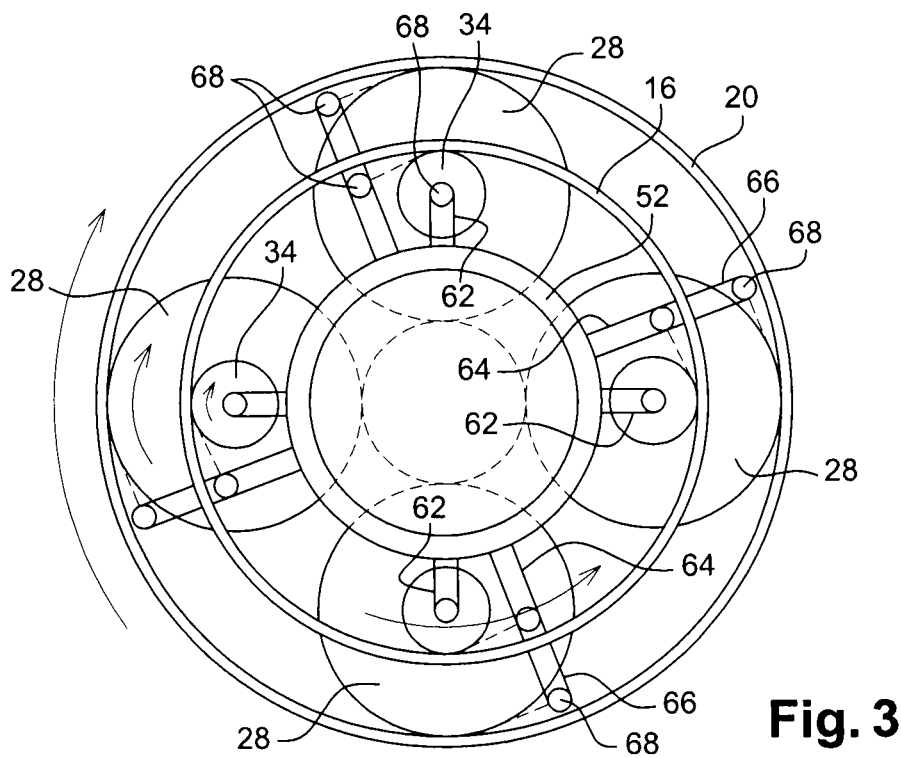
FIG. 3 is a diagrammatic face view of stepdown gearing of the invention.
Figure 4:
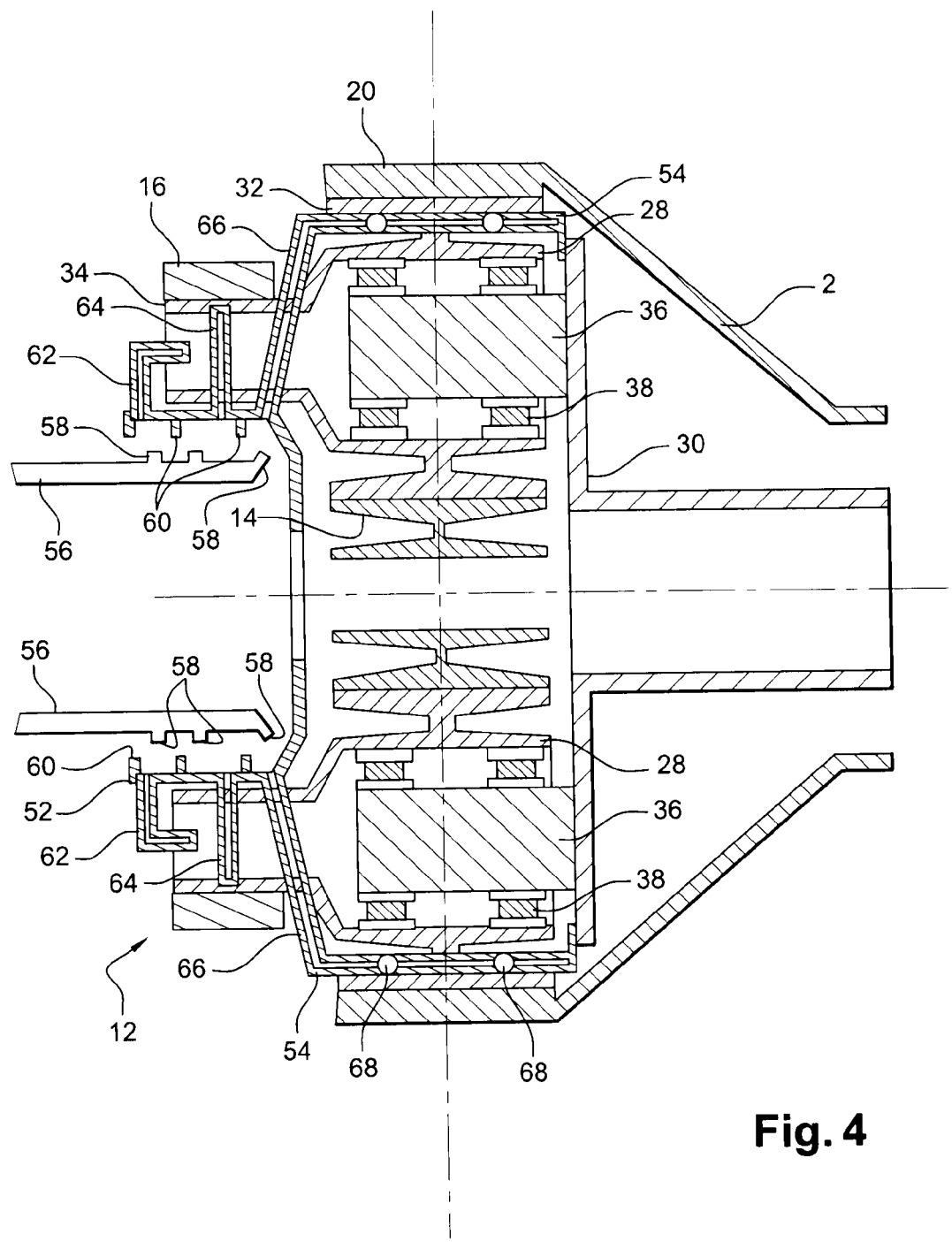
FIG. 4 is a diagrammatic axial section view of this stepdown gearing.

The present invention enables this problem to be solved in a manner that is simple, reliable, and inexpensive by means of a device shown diagrammatically in FIGS. 3 and 4 and that essentially comprises a cylindrical casing 52 situated on the upstream side of the stepdown gearing 12, inside the stationary outer ring 16, the cylindrical casing 52 being constrained to rotate with the planet carrier 30 to which it is fastened by axial arms 54 that extend inside the stepdown gearing 12 between the planet gears 28.

The cylindrical casing 52 forms a centrifugal scoop for recovering the oil delivered by two diametrically opposite strips 56 that extend from upstream towards the stepdown gearing 12 along the shaft carrying the central gear 14 and that are fitted with injectors 58 that spray oil into adjacent annular compartments formed inside the cylindrical casing 52 by internal radial partitions 60 thereof. Each annular compartment of the cylindrical casing 52 is connected to radial or substantially radial ducts 62, 64, 66 that extend outwards and that are fitted at their free ends with nozzles 68 pointing towards the zones that are to be lubricated and cooled, i.e. towards the ball bearings 38 of the planet gears 28 and towards the zones where the planet gears 28 mesh with the stationary outer ring 16, with the moving outer ring 20, and possibly with the central gear 14.

As shown diagrammatically in FIG. 3, the nozzles 68 are positioned angularly relative to the planet gears 28 in such a manner as to be located upstream from these gears relative to their direction of rotation and to direct their jets of oil tangentially onto the sets of teeth of the gears in the zones where they begin to mesh with the sets of teeth of the first ring 16, of the second ring 20, and of the central gear 14, respectively.

FIG. 4 shows diagrammatically how stepdown gearing 12 of the invention is incorporated in a turbomachine of the type shown in FIG. 1.

The central gear 14 can be lubricated and cooled by a nozzle 44 mounted at the downstream end of a strip 56 for feeding oil into the inside of the cylindrical casing 52. Since the central gear 14 has an outside diameter that is much smaller than the inside diameter of the rings 16 and 20, lubricating the zones where the peripheral sets of teeth 32 of the planet gears 28 mesh with the central gear 14 at two diametrically opposite points that are stationary can suffice and gives rise to much fewer problems than intermittent lubrication of the zones where the peripheral sets of teeth 32 and 34 of the planet gears 28 mesh with the outer rings 20 and 16, respectively.

Figure 5:
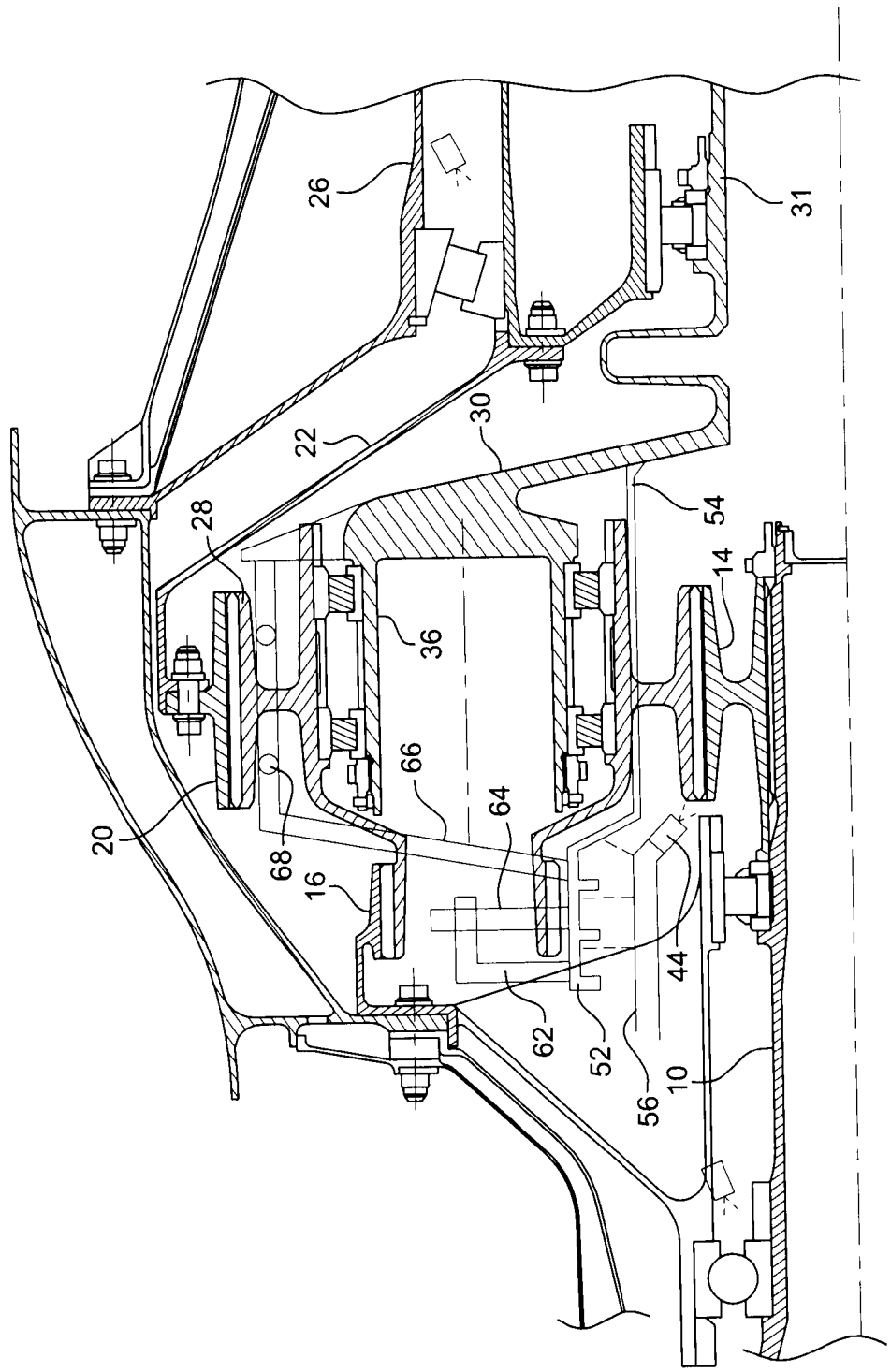
FIG. 5 is a diagrammatic half-view in axial section of stepdown gearing of the invention mounted in a turbomachine.

Otherwise, FIG. 5 shows the same elements as FIG. 4, associated with the components of the turbomachine of FIG. 1.

The invention is also applicable to epicyclic stepdown gearing having only one outer ring. Under such circumstances, it may for example be the first outer ring 16 that is omitted, with the second outer ring 20 being conserved. By adjusting the pitch of the propellers, i.e. the angular setting of the blades forming the propellers, it is possible to determine the speed of one propeller relative to the other, with braking one propeller serving to accelerate the other propeller until they reach equilibrium.

The invention claimed is:

1. An epicyclic stepdown gearing comprising:
   a central gear;
   an outer ring;
   planet gears meshing with the central gear and with the outer ring, the planet gears being mounted to rotate freely on a planet-carrier; and
   lubricating and cooling means operating by spraying oil onto sets of teeth and onto axes of the planet gears,
   wherein the lubricating and cooling means comprises a cylindrical casing secured to the planet-carrier and forming a scoop for recovering oil, which casing surrounds stationary means for delivering oil.

2. A gearing according to claim 1, wherein the cylindrical casing includes radial ducts for feeding oil to nozzles pointing towards the sets of teeth and the axes of the planet gears.

3. A gearing according to claim 1, wherein the stationary means for delivering oil comprises at least one strip parallel to the shaft of the central gear and carrying injectors pointing radially towards the cylindrical casing, the casing including annular compartments that are separated by radial partitions, each of which is connected to ducts for feeding nozzles.

4. A gearing according to claim 3, wherein the stationary means for delivering oil comprises two diametrically opposite and parallel strips carrying injectors pointing towards the annular compartments of the cylindrical casing.

5. A gearing according to claim 1, wherein nozzles are located upstream from the planet gears relative to their direction of rotation, and are pointing tangentially relative to the sets of teeth of the planet gears towards the zones where the sets of teeth mesh with the outer ring.

6. A gearing according to claim 1, wherein the cylindrical casing and the planet-carrier are positioned axially on either side of the central gear and they are connected together by axial arms extending between the planet gears.

7. A gearing according to claim 1, comprising two coaxial outer rings, with sets of teeth of the rings meshing with peripheral sets of teeth of the planet gears, one of the rings being stationary and the other being movable in rotation.

8. A turbomachine, or an aeroengine, comprising an epicyclic stepdown gearing according to claim 1, connecting a turbine shaft to one or two propeller drive shafts.

9. An epicyclic stepdown gearing comprising:
   a central gear;
   an outer ring;
   planet gears meshing with the central gear and with the outer ring, the planet gears being mounted to rotate freely on a planet-carrier; and
   a lubricating mechanism arranged to spray oil onto sets of teeth and onto axes of the planet gears, wherein the lubricating mechanism comprises a cylindrical casing secured to the planet-carrier, and wherein said cylindrical casing is positioned to recover oil.

10. A gearing according to claim 9, wherein the cylindrical casing includes radial ducts for feeding oil to nozzles arranged to spray oil onto the sets of teeth and the axes of the planet gears.

11. A gearing according to claim 9, wherein the cylindrical casing is located upstream from the planet gears relative to their direction of rotation.

12. A gearing according to claim 9, wherein the cylindrical casing forms a scoop for recovering said oil.

* * * * *